United States Patent [19]

Thoman et al.

[11] Patent Number: 5,595,417
[45] Date of Patent: Jan. 21, 1997

[54] TONNEAU COVER FOR A PICK-UP TRUCK

[76] Inventors: David C. Thoman; Christopfer M. Thoman, both of 623 W. Mishawaka Ave., Mishawaka, Ind. 46545

[21] Appl. No.: 507,115

[22] Filed: Jul. 26, 1995

[51] Int. Cl.⁶ .................................................... B60P 7/02
[52] U.S. Cl. ....................... 296/100; 70/167; 160/231.2; 292/213
[58] Field of Search .............................. 296/100; 70/167, 70/168, 169, 123; 160/35, 231.1, 231.2, 230; 292/173, 198, 213

[56] References Cited

U.S. PATENT DOCUMENTS

| | | | |
|---|---|---|---|
| 761,355 | 5/1904 | Bucknam | 292/173 X |
| 3,054,325 | 9/1962 | Crockwell | 160/230 X |
| 3,596,484 | 8/1971 | Peters | 292/198 X |
| 4,418,954 | 12/1983 | Buckley | 296/100 |
| 4,550,945 | 11/1985 | Englehardt | 296/100 |
| 4,673,087 | 6/1987 | Webb | 206/600 |
| 4,747,441 | 5/1988 | Apolzer | 160/84.1 |
| 4,824,162 | 4/1989 | Geisler | 296/100 |
| 4,844,531 | 7/1989 | Kooiker | 296/100 |
| 4,861,092 | 8/1989 | Bogard | 296/100 |
| 4,946,217 | 8/1990 | Steffens | 296/100 |
| 5,011,214 | 4/1991 | Friesen | 296/100 |
| 5,087,093 | 2/1992 | Repetti | 296/100 |
| 5,484,178 | 1/1996 | Sandhu et al. | 292/173 |

*Primary Examiner*—David M. Mitchell
*Assistant Examiner*—Kia M. Robinson
*Attorney, Agent, or Firm*—Lee H. McCormick, Jr.

[57] ABSTRACT

A tonneau cover for an open bed of a pick-up truck having a front panel, a center panel and a rear panel. Each panel is retained in separate frames defined by first, second, third and fourth reinforcing members which are held in a rectangular shape by corner members. Corner members on a first side of the frame of the center panel retain fixed pins that extend into corresponding openings in a first side wall extending from the open bed and corner members on a second side of the frame retain retractable pins which after being released from retraction extend into corresponding openings in a second side wall extending from the open bed to fix the center panel with respect to the open bed. The front and rear panels are joined to the center panel by rubber hinges. In a first position, the front panel and rear panel engage the top surface of the first and second side wall to define a closed compartment and in a second position, the front panel and rear panel rotate to overlay the center panel and form a work surface with respect to the open bed.

20 Claims, 4 Drawing Sheets

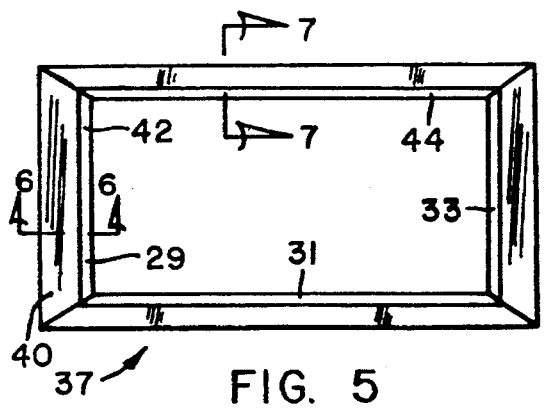
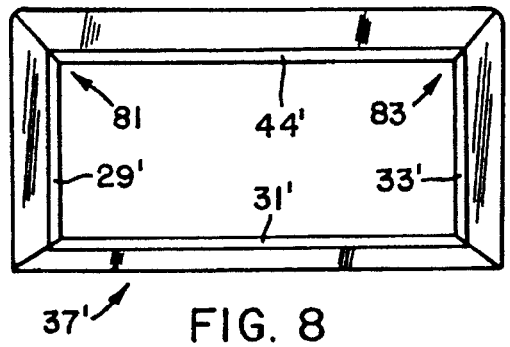
FIG. 5  FIG. 8
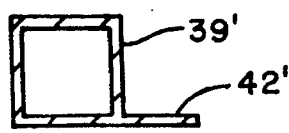
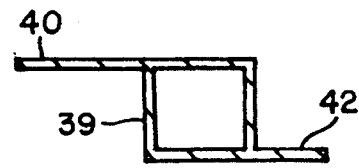
FIG. 7  FIG. 6
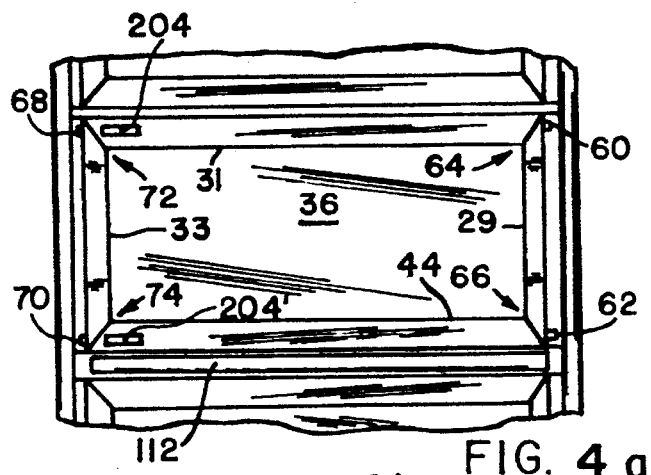
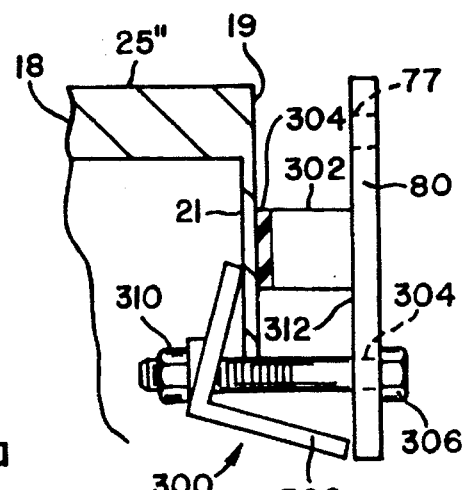
FIG. 4a  FIG. 11
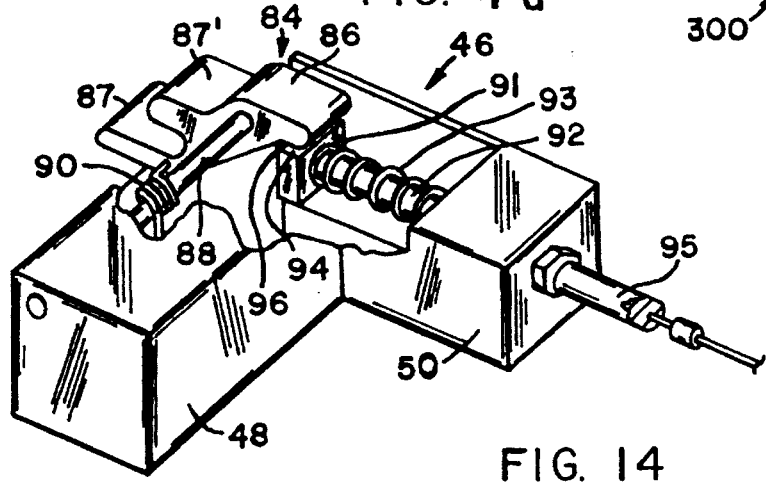
FIG. 14

TONNEAU COVER FOR A PICK-UP TRUCK

This invention relates to a tonneau cover for an open bed of a pick-up truck. The tonneau cover has a front panel, a center panel and a rear panel that engage a top surface of the side walls which extend from the open bed to form a sealed compartment. The front panel and rear panel are rotatable to an opened position where the front and rear panels overlay the center panel to form a work surface.

BACKGROUND OF THE INVENTION

An opened bed for pick-up trucks have been covered by a variety of tonneau covers such as canvas or vinyl tarps which can be attached by straps, snaps and velcro members, single plastic panels that are secured to side panels of the opened bed by bolts, caps that are attached to the side walls and multi-piece covers that are interconnected by hinges.

Some inconvenience or appearance deterioration may exist with each of such covers, for example with such multi-piece covers, various hinges are exposed to the elements and after a period of time corrosion can occur and worse still water may be communicated to the compartment intended to be covered. One such multi-compartment cover is disclosed in U.S. Pat. No. 4,861,092 wherein front and rear panels are connected to a center panel through caliper hinges. This type of cover requires multi fasteners and after exposure to the atmosphere over a period of time tend to discolor and may even rust. In addition, this type cover while operating in a satisfactory manner, is limited to the extent that the front and rear panels may be simultaneously opened and they never form a smooth work surface on the opened bed.

SUMMARY OF THE INVENTION

The present invention provides a tonneau cover for enclosing an open bed of a pick-up truck which overcomes the disadvantages of the prior art. The tonneau cover has a front panel, a center panel and a rear panel retained in separate frames. Each frame being defined by first, second, third and fourth reinforcing members enclosing a composite core made up of a foam center sandwiched between sheets of plastic. The reinforcing frames are made of aluminum and held in a rectangular shape by corner members made of plastic. First and second corner member located on a first side of the frame of the center panel have fixed pins that extend into corresponding openings in a first reinforcing bar secured by at least three bolts to a first side wall extending from the open bed. Third and fourth corner members on an opposite second side of the frame retains pins of first and second retractable members. The pins in the retractable members upon being released from a retracted position extend into corresponding openings in a second reinforcing bar secured by at least three bolts to a second side wall extending from the open bed to fix the location of the center panel with respect to the open bed. The front and rear panels are joined to the center panel by rubber hinges such that in a first position, the front panel and rear panel engage at least the top surface of the first and second side walls to define a closed compartment. The front panel and rear panel are rotatable to a second position where they overlay the center panel to form a work surface with respect to the open bed.

It is an object of this invention to provide a tonneau cover for on open bed of a pick-up truck that substantially seals an open bed from the surrounding environment.

It is a further object of this invention to provide a tonneau cover for an opened bed of a pick-up truck. The tonneau cover has a front panel and a rear panel hinged to a center panel. The center panel is secured to parallel side walls while the front panel and rear panel are closed on the side walls to form a sealed compartment for the opened bed. The front, rear and center panels may be covered by a fabric retained by a seal which engages the non-common peripherial surfaces of the front, rear and center panels to assure that any water present in a surrounding environment is not communicated to the sealed compartment.

BRIEF DESCRIPTION OF THE DRAWINGS

These objects and advantages should be apparent from reading this specification while viewing the accompanying drawings in which:

FIG. 4a is a partial sectional view showing an alternate attachment of the center panel to the sidewalls of the open bed of the pick-up truck;

FIG. 5 is a top perspective view of reinforcing members for a frame used in a center panel;

FIG. 6 is a sectional view taken along line 6—6 of FIG. 5;

FIG. 7 is a sectional view taken along line 7—7 of FIG. 5;

FIG. 8 is a top perspective view of reinforcing members for a frame used in front and rear panels;

FIG. 11 is a sectional view taken along line 11—11 of FIG. 9;

FIG. 14 is an enlarged perspective and partial sectional view of the latching means of FIG. 13;

DETAILED DESCRIPTION OF THE INVENTION

Figure 1:
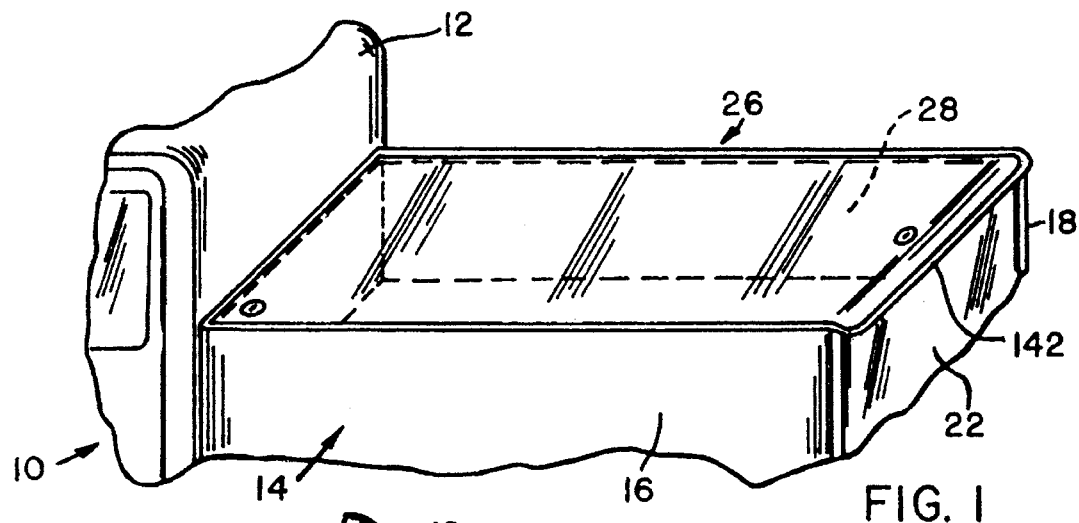
FIG. 1 is a side view of a pick-up truck with a tonneau cover, made according to the present invention, attached to an open bed to define a sealed compartment.

The pick-up truck 10 shown in FIG. 1 is conventional in that an enclosed cab 12 is separated from an opened bed 14, see FIG. 6, for carrying cargo. The opened bed 14 has a flat surface 15 with parallel side walls 16 and 18 extended therefrom which are joined to a front end wall 20 and a rear end wall or tailgate 22. The rear end wall 22 is attached to the rear end of the base or flat surface 15 of the opened bed 14 and rotatable with respect to the flat surface 15 into engagement with the ends of the side walls 16 and 18 to a vertical position substantially parallel with the side walls 16 and 18. The side walls 16 and 18, front end wall 20 and rear end wall 22 have a top surface 25,25',25" and 25'", respectively, all of which are in a horizontal plane at the fixed distance from the flat surface 15 of the opened bed 24. A tonneau cover 26, of the present invention, engages each top surface 25,25'25" and 25'" to form a compartment 28 and seal the open bed 14 from the surrounding environment.

Figure 17:
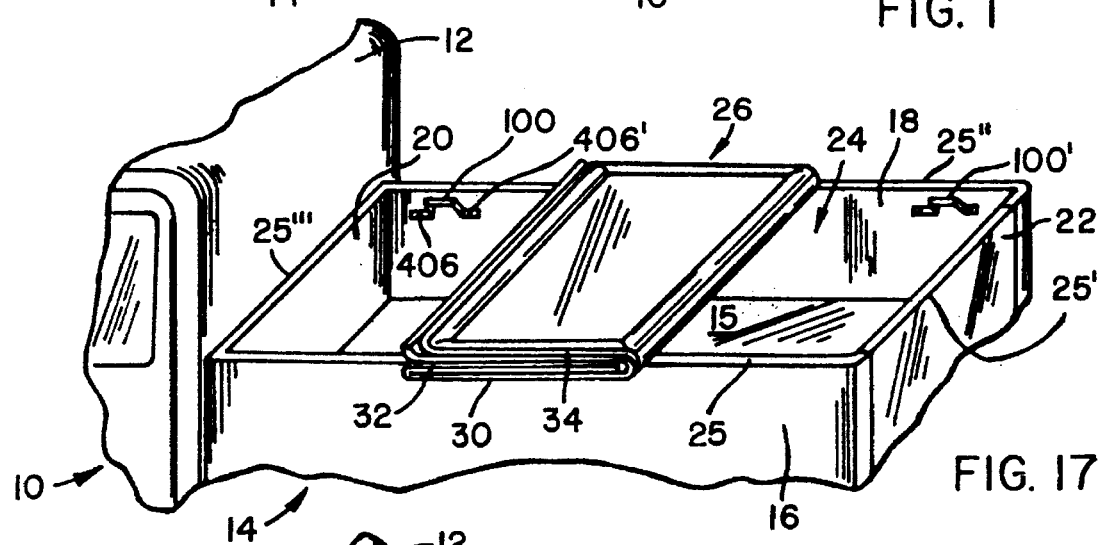
FIG. 17 is a view of the tonneau cover of FIG. 1 with a front panel and rear panel in an opened position overlying the center panel to define a work surface on the open bed of the pick-up truck.
Figure 3:
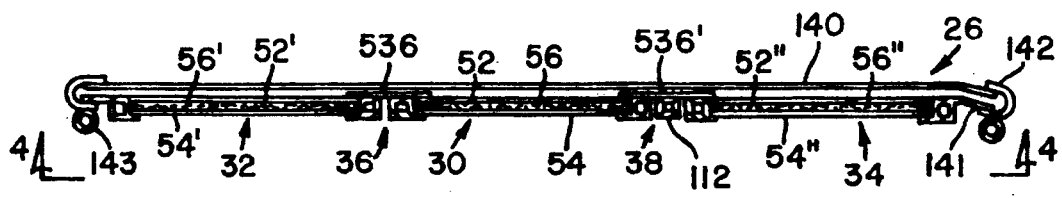
FIG. 3 is a sectional view taken along line 3—3 of FIG. 2.

The tonneau cover 26 comprises a center panel 30, a front panel 32 and a rear panel 34 which are sequentially joined together by first 36 and second 38 rubber hinges, see FIG. 3. The front panel 32 and rear panel 34 rotate with respect to the center panel 30 to provide access to the opened bed 24 and can be positioned to overlay the center panel 30 to create a work surface separate from flat surface 15 of the open bed 24, see FIG. 17.

The center panel 30, front panel 32 and rear panel 34 are each constructed in a similar manner. In this specification, the components for the center panel 30 are identified by a whole number and only when needed for clarity of this invention will similar structural components be identified by a prime (') for the front panel and a double Prime (") for the rear panel.

The center panel 30, front panel 32 and rear panel 34 are each retained in a tubular frame having a desired longitudinal length that is substantially the width of the front end wall 20 and the tailgate 22. Each of the panel is made up of a frame and a center composite made of a foam member 56 sandwiched between and bonded to top 52 and bottom 54 hard plastic sheets. Each panel has substantially the same physical rectangular shape after the composite is bonded to a tubular frame.

Tubular frame 37, see FIG. 5, is designed for use in a center panel 30. Frame 37 is made up by joining together first 29, second 31, third 33 and fourth 44 reinforcing members with corresponding corner members 46. The first 29 and third 33 reinforcing members have a cross sectional shape, as illustrated in FIG. 6, with a top ledge or lip 40 and a smaller bottom ledge or lip 42 extending from a square body 39 while the second 31 and fourth 44 reinforcing members only have square body 39' and a bottom ledge or lip 42' as illustrated by the cross sectional shape in FIG. 7.

Figure 15:
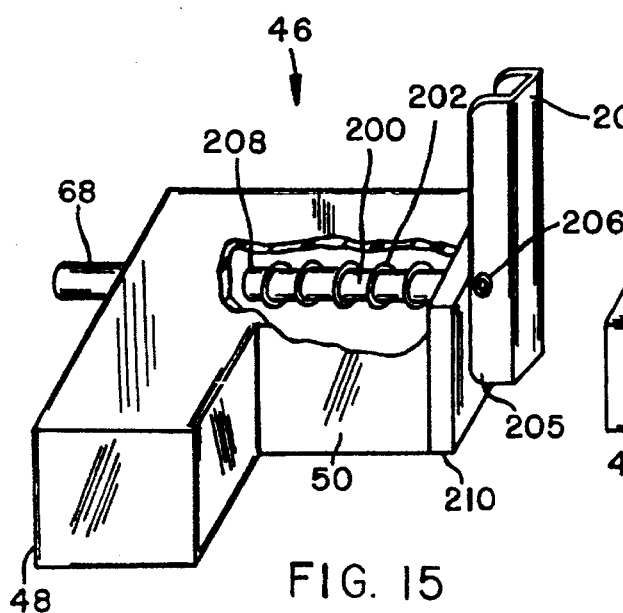
FIG. 15 is an enlarged view of a corner member having a retractable pin for securing the center panel of the tonneau cover to the side wall of the pick-up truck.
Figure 16:
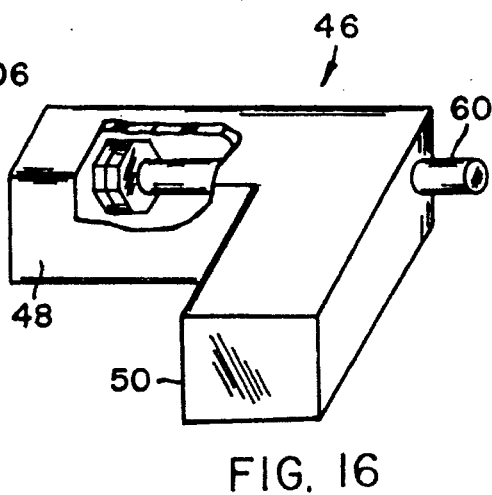
FIG. 16 is an enlarged view of a stationary pin for securing the center panel of the tonneau cover to the side wall of the pick-up truck.

Each corner member 46 basically has the same shape, as illustrated in FIGS. 14, 15 and 16, with square first 48 and second 50 ends. The first end 48 and second end 50 are perpendicular to each other and are located in a square section 39 formed at least on the ends of longitudinal lengths of first 29, second 31, third 33 and fourth 44 reinforcing members to form frame 37. The relationship between the square sections and the reinforcing member prevents twisting while creating a substantially rectangular shape, see the combined views in FIGS. 3, 4 and 5.

The frames 37' and 37" for the front panel 32 and the rear panel 34, respectively, are identical and best illustrated in FIG. 8. These frames 37' and 37" are similar to frame 37 but are formed by joining together first 29', third 33' and fourth 44' reinforcing members, which have a cross section as illustrated in FIG. 6, with a reinforcing member 31' which has a cross section illustrated in FIG. 7 to define a rectangular member shape. After frames 37' and 37" are made a composite member is placed on and bonded to the bottom ledge or lip 42 by an adhesive to define panel members 32 and 34.

The top lip or peripheral lip 40 of frames 37,37' and 37" has a cross section as illustrated in FIG. 6 and are designed to engage the top surfaces 25, 25" and 25'" of the opened bed 24 while bottom lips 42,42' are designed to retain the panel composite.

Certain of the corner members 46 in addition to defining right angles for frames 37,37' and 37" are also adapted to retain means through which the tonneau cover 26 is attached to the opened bed 24. In particular, frame 37 for the center panel 30 has first 60 and second 62 stationary projections or pins which perpendicularly extend from the first 64 and second 66 corner members associated with a first reinforcing member 29, see FIGS. 4 and 16, while first 68 and second 70 retractable and projectional members or pins perpendicularly extend from first 72 and second 74 corner members associated with third reinforcing member 33, see FIGS. 4 and 15.

The first 60 and second 62 stationary members or pins as shown in FIG. 11, are bolts that are secured to the plastic body of the corner member 46 by nuts but it is envisioned that such pins could be molded into the corners.

The retractable projections or pins 68 and 70, as best illustrated in FIG. 15, each include a plunger 200, a spring 202, a lever 204 and a cotter pin 206. The spring 202 and plunger 200 are located in a bore 208 in the corner member 46 with the end of the plunger 200 extending through an end wall 210 for attachment the lever 204 by cotter pin 206. Lever member 204 has a cam surface 205 that engages the end wall 210 and linearly moves the plunger 200 by overcoming the spring 202 to retract the plunger 200 into the bore 208. By moving the lever 204 to a perpendicular position as shown in FIG. 15, spring 202 moves the plunger 200 to a position out of the bore 208 and bring pin 68 into engagement with an attachment bar 80 on the side wall 18 of the opened bed 24.

Figure 9:
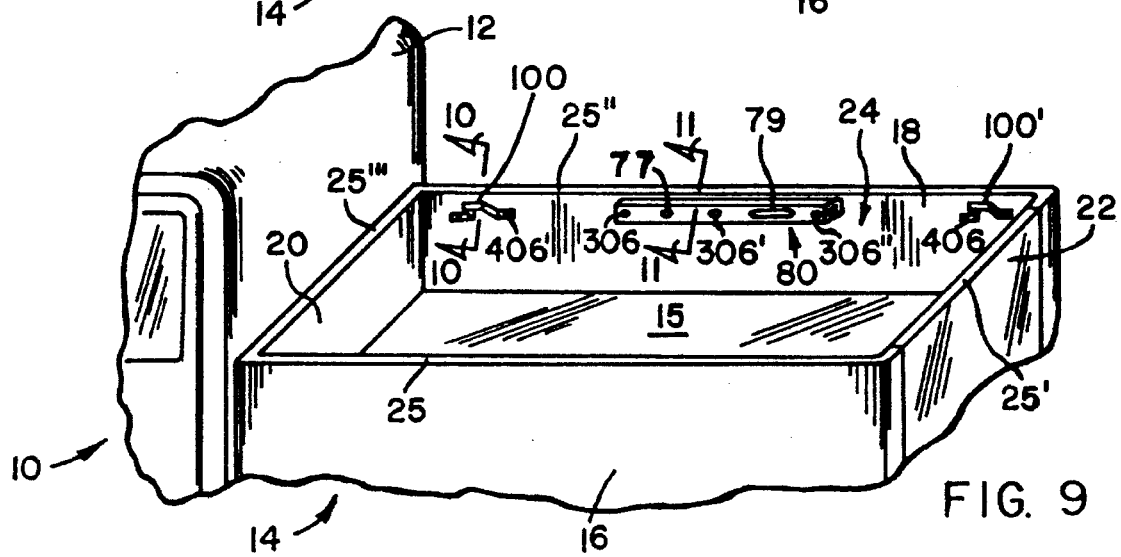
FIG. 9 is a view of an opened bed of the pick-up truck of FIG. 1 illustrating latching striker bars and an attachment bar attached to a side wall of the opened bed to which the tonneau cover is attached to form a sealed compartment.

(A) attachment bar 80 attached to side wall 18, see FIG. 9 and a corresponding (A) attachment bar attached to side wall 16 are identical and located on opposite sides of the side wails 16 and 18 to locate and fix the center panel 30 with respect to the opened bed 24. Only (A) attachment bar 80 and its relationship with side wall 18 is hereinafter described in detail. (A) attachment bar 80 is attached to side wall 18 through the clamp means 300 shown in FIG. 11. Clamp means 300 has a square spacer 302 with a rubber face 304 which engages the face 19 of the side wall 18. (A) attachment bar 80 has a hole 304 through which bolt 306 extends to join right angle member 308 with lip 21 on the side wall 18. As nut 310 is tightened, right angle member 308 engages both lip 21 and (A) attachment bar to clamp spacer 302 between face 19 and face 312 to secure the attachment bar 80 to side wall 18. The attachment bar 80 attached side wall 18 has a circular opening 77 and an oval opening 79 for receiving the retractable pins 68 and 70.

The pins for the first 60 and second 62 stationary projections or pins are designed to extend into a circular opening and an oval opening, respectively, on a attachment bar (not shown) attached to side wall 16 of the opened bed 24. It should be noted that the once the first projections or pins 60 and 62 are located in the circular and oval openings in the attachment bar on side wall 16, some movement can occur such that retractable pin 68 can be aligned with opening 77 in attachment bar 80 to assure that the center panel 30 is correctly positioned on the opened bed 24.

Figure 4:
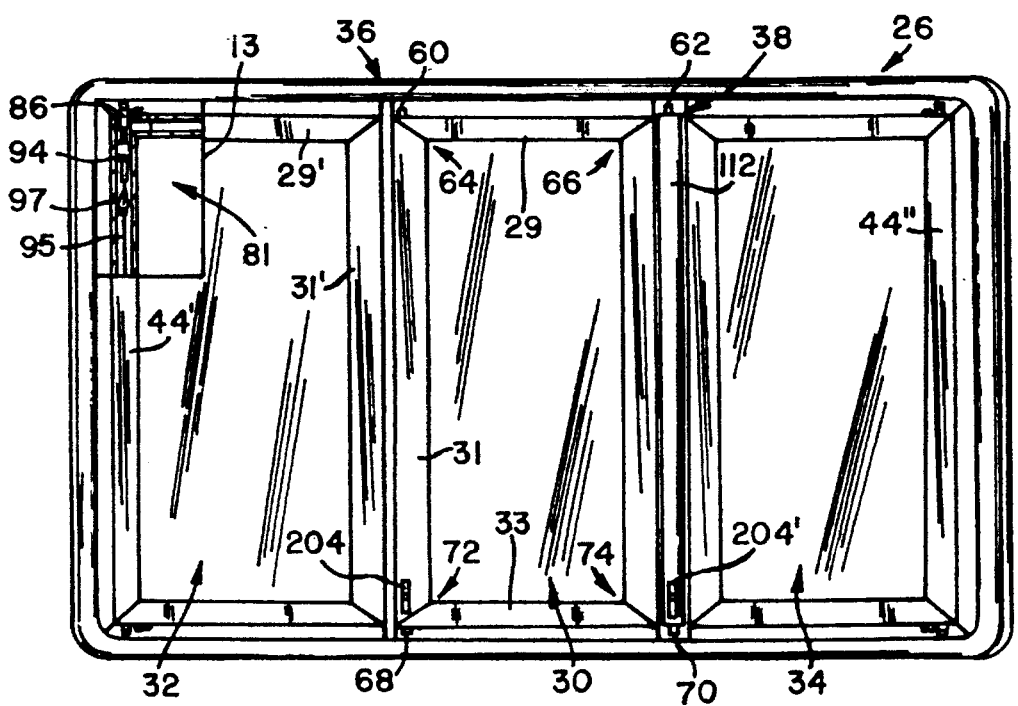
FIG. 4 is a view taken along line 4—4 of FIG. 3 with a partial sectional illustration of a corner member and lock member through which a front panel is attached to a side wall of the open bed of the pick-up truck.
Figure 13:
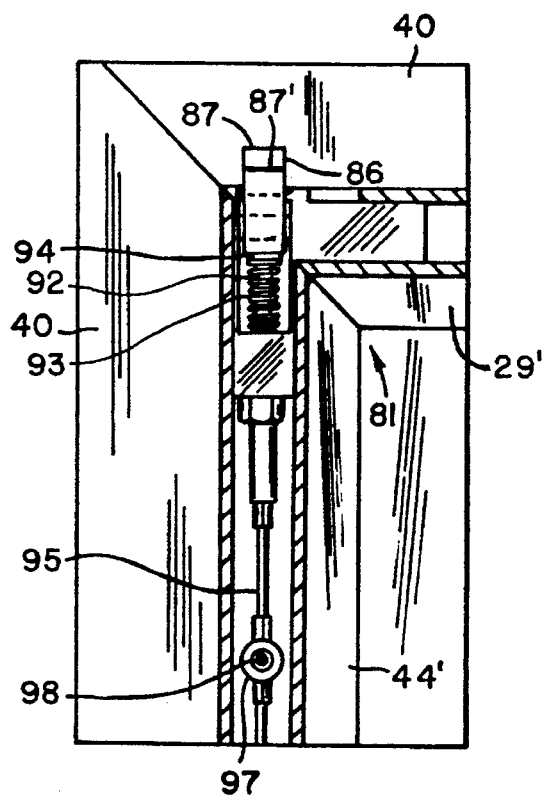
FIG. 13 is an enlarged sectional view of the sectional segment 13 of the corner member and latching means of FIG. 4.

The corner members 81 and 83 in the front panel 32 and corner members 81' and 83' in the rear panel are identical and each one is adapted to retain the same type latching means 84, as best shown in FIGS. 4, 13 and 14 to secure the front panel 32 and rear panel 34 to the side walls 16 and 18. Only latching means 84 for corner 81 is hereinafter described in detail. Latching means 84 has a yoke member 86, see FIG. 14, which is retained by a pin 88 located in a corner member 46. A first spring 90 attached to the corner 46 acts on and rotates the yoke 86 to an opened position as shown in FIG. 13. A plunger 92 located in a bore 91 of corner 46 has a face 94 which is urged into engagement with a lip surface 96 on yoke 86 by a spring 93. A cable 95 attached to plunger 92 is connected to a cylinder 97 of a key member 98, see FIGS. 2 and 3. Rotation of cylinder 97 by a key moves plunger 92 to overcome spring 93 and allow spring 90 to position yoke 86 in an opened position. The tines 87,87' of yoke 86 are designed to engage the U-shaped ring or striker bar 100 attached to side wall 18. Striker bar 100 is attached to side wall 18 by a clamp means 400 shown in FIGS. 9 and 16.

Figure 10:
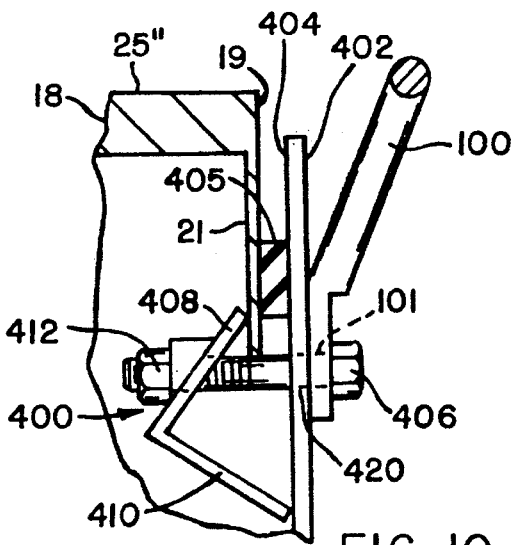
FIG. 10 is a sectional view taken along line 10—10 of FIG. 9.

Clamp means 400 as best shown in FIG. 10, includes a bracket 402 with a face 404, a portion of which is coated with rubber 405 which engages face 19 on side wall 18. Bracket 402 has an hole 420 which is aligned with a corresponding hole 101 in striker bar 100. A bolt 406 extends through the openings in the bracket and striker bar and into opening 408 in right angle member 410. As bolt 406 is fastened to nut 412, face 404 engages face 19 to secure striker bar 100 to the side wall 18. Striker bar 100 extends at an angle from bracket 402 such that striker bar 100 is slightly askew with respect to the parallel side wall 18 to aid in engagement with tines 87,87' of the latching means 84.

When a force is applied to a panel and yoke 86 of a latching means 84 is brought into engagement with a striker bar 100, yoke 86 pivots on pin 88 and allows spring 93 to move plunger 92 into engagement with flat surface on lip 96 of yoke 86 to define a latching relationship. In this relationship, spring 93 holds the yoke 86 in a stationary and fixed position with respect to the striker bar 100 to secure a panel to the side wall of the pick-up truck.

Figure 2:
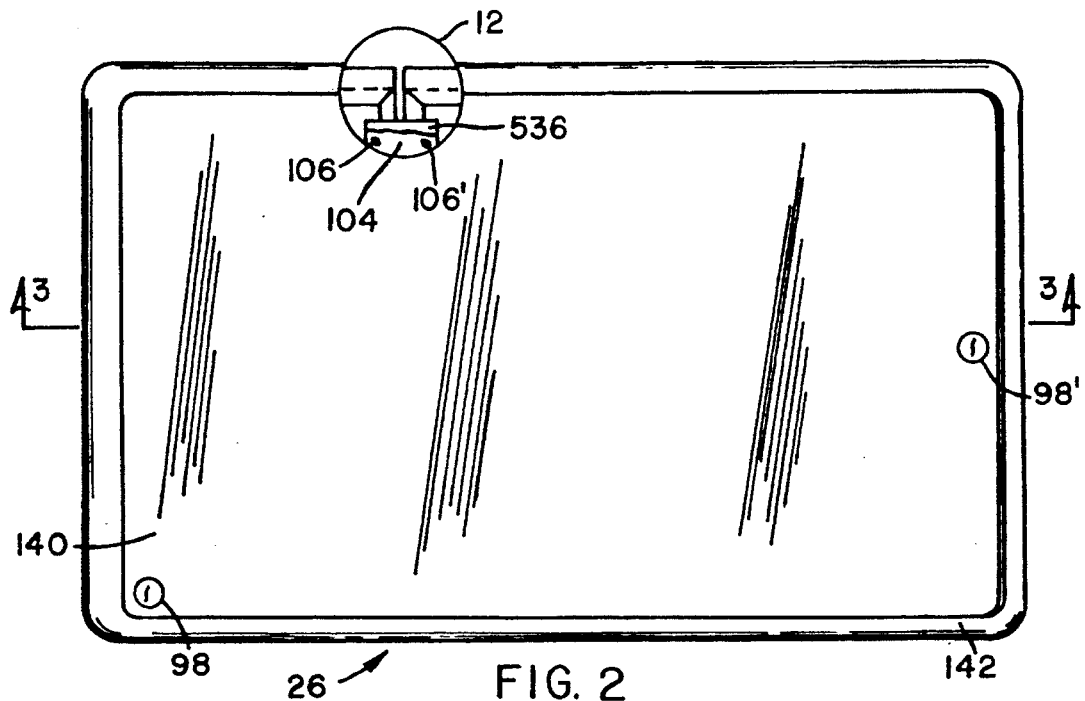
FIG. 2 is a top view of the tonneau cover.
Figure 12:
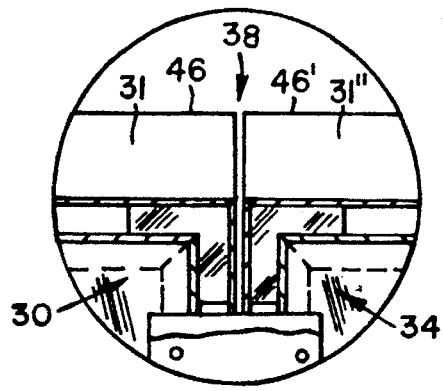
FIG. 12 is an enlarged view of the circumscribed area 12 of FIG. 2 illustrating a segment of a rubber hinge for a center panel of the tonneau cover.

The front panel 32 is connected to the center panel 30 by the first rubber hinge 36, see FIGS. 2, 3, and 12, while the rear panel 34 is connected to the center panel 30 by a similar second rubber hinge 38. Each of the rubber hinges 36 and 38 has a strip 536 of rubber which is bonded to the top lip 40' of an inner reinforcing members for frames 37,37' and 37". The bond is developed by placing a bead of water proof adhesive on both the strip 536 of rubber material and surfaces 42,42' associated with reinforcing members 31, 31' and 31" of frames 37, 37' and 37". During evaluation of hinge materials, neoprene was used for the strip of rubber material and it was bonded to an aluminum reinforcing member. The resulting bond was tested for shear strength and the neoprene would tear before the bond would fracture.

Under some circumstances, it may be desirable to provide an assist in the opening of the front panel 32 and rear panel 34 and as a result a thin sheet 104 of spring steel having a slight bend is placed on top of the rubber hinges 36 and 38. This thin sheet 104 is attached to the reinforcing members through screws 106, as illustrated in FIG. 12 for hinge 38.

The slight bent in the thin sheet 104 attempts to move the front panel 32 and rear panel 34 from a position in a plane parallel with the center panel 30 to a position that is slightly askew thereto.

The second stationery projection or pin 62 and the second retractable projection or pin 70 are illustrated in FIGS. 3, 4 and 16 as being located in spacer member 112 however in some applications it may be desirable to locate such pins in the center panel 30 as shown in FIG. 4a.

A fabric cover 140 as best shown in FIGS. 2 and 3 is designed to substantially enclosed the entire surface area of the front panel 32, center panel 30 and rear panel 34. The fabric cover 140 is stretched over the front panel 32, center panel 30 and rear panel 34 and held in place by a c-shaped clamp or seal 142 that extends around the entire peripheral surface of the front panel 32, center panel 30 and rear panel 34. The c-shaped clamp or seal 142 has a bulb 143 which engages the top surface 25,25,25" and 25"' to form a water tight seal between the surrounding environment and the sealed compartment.

METHOD OF INSTALLATION AND OPERATION OF THE INVENTION

For ease in storage and shipping to customers, the front panel 32 and rear panel 34 are designed to sequentially overlay the center panel 30.

To install the tonneau cover 26 on an opened bed 24 of a pickup truck, an operator would place the pins of first and second stationary projection of the center panel 30 in circular and oval openings in attachment bar on side wall 16. Thereafter, the plunger or pin 200 of the first retractable projection or pin 60 is aligned with circular opening 77 and the lever 204 rotated to allow spring 202 to move the plunger or pin 200 into circular opening 77. Subsequently, the plunger or pin 200' of the second retractable projection or pin 62 is released to into the oval opening 79 in the attachment bar 80 to affix the center panel 30 to the side walls 16 and 18. When pin or plunger 200 for retractable projection 68 and 70 are released from their retracted position and located in circular opening 77 and oval opening 79 in attachment bar 80 attached to side wall 18 of the opened bed 24, the center panel 30 is fixed to the opened bed 24. Thereafter, the rear panel 34 is rotated from the overlying position wherein the peripheral lip 40 on the reinforcing members engage top surfaces 25,25" of the side walls 16 and 18 and the yokes 86 on the latching means 84 engage the U-shaped ring or striker bar 100' on the side walls 16 and 18 to allow the springs 93 to hold the plunder 92 and yoke 86 in a stationary and secured position. With the latching means 84 in this latched position, bulb 143 on the end of reinforcing member 44 for frame 37" of rear panel 34 engages the rear end wall or tail gate 22, as shown in FIG. 1, to prevent the rear end wall or tail gate 22 from being opened. Similarly, the front panel 32 is moved from a position overlying the center panel 30 to a closed position where the peripheral lip 40 of the reinforcing members of frame 37' engage the top surfaces 25, 25" and 25"'. When a sufficient force is applied to the front panel 32, the yokes 86 on the latching means 84 engage the U-shaped rings or striker bars 100 on the side walls 16 and 18 to allow corresponding springs 93 to hold move plungers 92 into a position to hold yokes 86 in a stationary and secure locked position with respect to the striker bars 100. In the locked and covered position, the tonneau cover 26 prevents the communication of water and air borne particles from entering the now sealed compartment of the opened bed 24.

When an operator desires to open the front panel 32, a key is placed in the latching mechanism 98 and cylinder 96 is rotated to develop a force which is communicated through cable 95 to overcome springs 93 and allow springs 90 to move the yoke 86 such that yoke 86 is disengaged from striker bar 100. The first hinge 36 allows the front panel 32 to rotate from a first position to a second-position where the front panel 32 is parallel to and overlays the center panel 30. Similarly, when it is desirable to open the rear panel 34, a key is placed in latching mechanism 98' by an operator and rotated to communicated a linear force through cable 95 to overcome springs 93 and thereafter allow springs 90 to move yokes 86 out of engagement with U-shaped ring or striker bars 100'. Thereafter, hinge 38 allows the rear panel 34 to rotate into a position where it is parallel to and overlays the center panel 30. With the front panel 32 and rear panel 34 overlaying the center panel 30 a work surface is formed which is substantially parallel with surface 15 of the opened bed 24.

We claim:

1. In combination with a pick-up truck of the type having an open bed for carrying cargo, said bed having a pair of spaced apart parallel side walls connected to a front end wall and a rear end wall, said rear end wall being rotatable with respect to said bed, said side walls, front end wall and rear end wall each having a top surface in substantially a same horizontal plane with respect to said bed, a tonneau cover for engaging each top surface to form a compartment and seal said open bed from the surrounding environment, said tonneau cover comprising: a center panel connected to a first frame formed by joining together first, second, third and fourth reinforcing members, said first and third reinforcing members of said first frame being fixed to said parallel side walls to secure and locate said center panel in a stationary position with respect to said open bed; a front panel connected to a second frame formed by joining together first, second, third and fourth reinforcing members; a first rubber hinge secured to said fourth reinforcing member of said first frame and said second reinforcing member of said second frame for joining said center panel with said front panel; a rear panel being connected to a third frame formed by joining together first, second, third and fourth reinforcing members; a spacer member; and a second rubber hinge secured to said second reinforcing member of said second frame, said spacer member and said fourth reinforcing member of said third frame for joining said center panel with said rear panel, said first hinge allowing said front panel to rotate from a first position engaging said top surface of said front end wall to a second position where said fourth reinforcing member of said second frame is parallel to and overlays said second reinforcing member of said first frame, said second hinge and said spacer member allowing said rear panel to rotate from first position engaging said top surface of said rear end wall to a second position where said second reinforcing member of said third frame is parallel to and overlays said fourth reinforcing member of said second frame, said center panel along with said front panel and rear panel in said second positions forming a work surface substantially parallel with said bed.

2. The tonneau cover as recited in claim 1 wherein first, second, third, and fourth reinforcing members of said first, second and third frames each include: tubular sections located adjacent first and second longitudinal ends thereof; and corner members having a first end and a second end, said first and second ends of the corner members being perpendicular to each other, said corner members being located in said tubular sections to join said first, second, third and fourth reinforcing members together to form a substantially rectangular shape.

3. The tonneau cover as recited in claim 1 wherein said first frame includes: first and second stationary pins extending from first and second corner members associated with said first reinforcing member and first and second retractable pins extending from first and second corner members extending from said third reinforcing member, said first and second stationary pins being located in corresponding openings in a first side wall and said first and second retractable pins being retracted and later moved to a released position in corresponding openings in a second side wall to secure said center panel to said first and second side wall.

4. The tonneau cover as recited in claim 3 wherein said first and second retractable pins are resiliently retained in said released position.

5. The tonneau cover as recited in claim 4 wherein said corresponding openings for said first and second stationary pins and first and second retractable pins include first openings with a circular shape and second openings with an oval shape, a first one of said circular shape opening and one of said oval shape opening being located in an attachment bar attached to said first side wall and a second of said circular shape opening and one of said oval shape opening being located in an attachment bar attached to said second side wall, said oval openings aiding in aligning said center panel with respect to said parallel side walls.

6. The tonneau cover as recited in claim 1 wherein said first frame includes: a first stationary pin extending from a first corner member associated with said first reinforcing member and a first retractable pin extending from a first corner member of said third reinforcing member, said first stationary pin being located in a corresponding opening in a first side wall and said first retractable pin being retracted and later moved to a released position in a corresponding opening in a second side wall to secure said center panel to said first and second side wall.

7. The tonneau cover as recited in claim 6 wherein said spacer member includes: a first stationary pin extending from a first end of a longitudinal tube and a first retractable pin extending from a second end of said longitudinal tube, said first stationary pin of said spacer member being located in a corresponding opening in said first side wall and said first retractable pin of said spacer member being retracted and later moved to a released position in a corresponding opening in said second side wall to assist in securing said center panel to said first and second side wall.

8. The tonneau cover as recited in claim 7 wherein said first retractable pin extending from said first corner member of said third reinforcing member and said first retractable pin of said spacer member are resiliently retained in said released position.

9. The tonneau cover as recited in claim 8 wherein said corresponding openings for said first stationary pin extending from said first corner of said first reinforcing member and said first stationary pin of said spacer member and said first retractable pins include first openings with a circular shape and a second opening with an oval shape, a first one of said circular shape opening and one of said oval shape opening being located in an attachment bar attached to said first side wall and a second of said circular shape opening and a second of said oval shape opening being located in an attachment bar attached to said second side wall, said oval openings aiding in aligning said center panel with respect to said parallel side walls.

10. The tonneau cover as recited in claim 5 wherein one of said corner members for said first reinforcing member and one of said corner members for said third reinforcing member associated of said second frame retain latching means that engage said parallel side walls to secure said front panel in said first position.

11. The tonneau cover as recited in claim 6 wherein one of said corner members for said first reinforcing member and one of said corner members for said third reinforcing member associated of said third frame retain latching means that engage said parallel side walls to secure said rear panel in said first position.

12. The tonneau cover as recited in claim 5 wherein said second reinforcing member for said third frame includes a seal that engages said rear end wall to hold said rear end wall in a vertical position with respect to said open bed when said rear panel is in the first position.

13. The tonneau cover as recited in claim 1 further including: a metallic backing for said first and second rubber hinges, said metallic backing being correspondingly secured to said first, second and third frames to provide a resilient force to aid in moving said first and third panels from their first positions toward their second positions.

14. The tonneau cover as recited in claim 5 further including: a unitary fabric which covers said front, center and rear panel to prevent moisture from being communicated to said compartment.

15. The tonneau cover as recited in claim 14 further including a unitary seal which engages the peripheral surface of said front, center and rear panel to retain said unitary fabric and engage said top surface of said of said front end wall, parallel side walls and rear end wall to aid in preventing moisture present in the environment from entering said compartment.

16. The tonneau cover as recited in claim 5 wherein said attachment bars, which include a first member with said circular and oval openings located therein, are attached to said side walls by clamping means, said clamping means including: a right angle member and fastener means, said fastener means engaging said first member and right angle member to bring one edge of the right angle member into engagement with a lip that extends from the side wall and another edge of the right angle member into engagement with the first member to join the first member to the side wall.

17. The tonneau cover as recited in claim 16 further including a spacer located between said first member and said lip to define a space whereby corresponding stationary and retractable pins may extend without engaging the side walls.

18. The tonneau cover as recited in claim 10 wherein said latching means further includes: first and second striker bars attached to said side walls of pick-up truck.

19. The tonneau cover as recited in claim 18 including clamping means having:

a bracket;

a square spacer for locating said bracket a fixed distance from said side walls;

a right angle member having a first leg and a second leg;

fastener means extending through openings in said striker bar, bracket and right angle member to bring said square spacer into engagement with the side wall and thereby fix the position of said striker bar with respect to said side wall.

20. The tonneau cover as recited in claim 19 wherein said striker bar extends at an angle from said bracket to assist in engagement with the latching means of said corner members of said first and third reinforcing members to secure said front panel to the open bed.

* * * * *